United States Patent
Klausen et al.

(10) Patent No.: US 9,897,096 B2
(45) Date of Patent: Feb. 20, 2018

(54) BEARING UNIT

(71) Applicant: Grundfos Holding a/s, Bjerringbro (DK)

(72) Inventors: Johnny Trangbaek Klausen, Viborg (DK); Thomas Sorensen, Silkeborg (DK)

(73) Assignee: Grundfos Holding a/s, Bjerringbro (DK)

( * ) Notice: Subject to any disclaimer, the term of this patent is extended or adjusted under 35 U.S.C. 154(b) by 522 days.

(21) Appl. No.: 14/268,304

(22) Filed: May 2, 2014

(65) Prior Publication Data

US 2014/0328677 A1 Nov. 6, 2014

(30) Foreign Application Priority Data

May 3, 2013 (EP) .................................... 13166407

(51) Int. Cl.
F04D 29/046 (2006.01)
F04D 29/047 (2006.01)
(Continued)

(52) U.S. Cl.
CPC ......... F04D 29/046 (2013.01); F04D 17/122 (2013.01); F04D 29/047 (2013.01);
(Continued)

(58) Field of Classification Search
CPC .. F04D 17/122; F04D 29/046; F04D 29/0465; F04D 29/047; F04D 29/628;
(Continued)

(56) References Cited

U.S. PATENT DOCUMENTS 2,702,730 A 2/1955 Ivanoff
2,956,841 A 10/1960 Cametti
(Continued)

FOREIGN PATENT DOCUMENTS

DE 8706954 U1 7/1987
DE 19824128 A1 12/1999
(Continued)

OTHER PUBLICATIONS

Search Report dated Oct. 15, 2013 in EP Application No. 13166407.0.

(Continued)

*Primary Examiner* — Mark Laurenzi
*Assistant Examiner* — Paul Thiede
(74) *Attorney, Agent, or Firm* — Panitch Schwarze Belisario & Nadel LLP

(57) ABSTRACT

A bearing unit (2), designed for attachment on a shaft of a pump assembly, has an inner sleeve (6) for receiving the shaft and a bearing sleeve (4) fixed on the outer periphery of the inner sleeve (6). At a first axial end (7) the inner sleeve (6) includes an engagement element (8), designed for positive, rotationally fixed engagement with the shaft or with a component (42) connected to the shaft. At a second opposite axial end the inner sleeve (6) includes a second contact shoulder (10), which fixes the bearing sleeve (4) in an axial direction (X). A pump assembly having such a bearing unit is also provided.

15 Claims, 8 Drawing Sheets

(51) Int. Cl.
*F16C 43/02* (2006.01)
*F04D 29/62* (2006.01)
*F16C 35/02* (2006.01)
*F16C 33/04* (2006.01)
*F04D 17/12* (2006.01)

(52) U.S. Cl.
CPC ....... *F04D 29/0465* (2013.01); *F04D 29/628* (2013.01); *F16C 35/02* (2013.01); *F16C 33/043* (2013.01); *F16C 43/02* (2013.01)

(58) Field of Classification Search
CPC ........ F16C 33/043; F16C 35/02; F16C 43/02; F01D 25/16
USPC .......................... 415/199.2; 384/29, 517, 215
See application file for complete search history.

(56) References Cited

U.S. PATENT DOCUMENTS

| | | | |
|---|---|---|---|
| 5,566,424 A * | 10/1996 | Crompton | G06F 1/1601 16/337 |
| 6,467,966 B1 | 10/2002 | Diederich et al. | |
| 7,517,154 B2 * | 4/2009 | McKeirnan, Jr. | F01D 25/16 384/517 |
| 9,234,593 B2 * | 1/2016 | Holzapfel | F16J 15/348 |
| 2005/0013713 A1 * | 1/2005 | Cooper | F04D 7/065 417/423.14 |
| 2010/0221105 A1 | 9/2010 | Markovitch | |
| 2011/0044568 A1 * | 2/2011 | Vedsted | F04D 29/0465 384/29 |
| 2013/0164125 A1 * | 6/2013 | Mikkelsen | F04D 1/00 415/203 |

FOREIGN PATENT DOCUMENTS

| | | |
|---|---|---|
| EP | 0345214 A1 | 12/1989 |
| EP | 0492605 A1 | 7/1992 |
| EP | 0667456 A1 | 8/1995 |
| WO | 9010161 A1 | 9/1990 |
| WO | WO 2011085762 A1 * | 7/2011 ............. F16J 15/348 |

OTHER PUBLICATIONS

Office Action dated Jun. 1, 2017 in CN Application No. 201410187168.8.

* cited by examiner

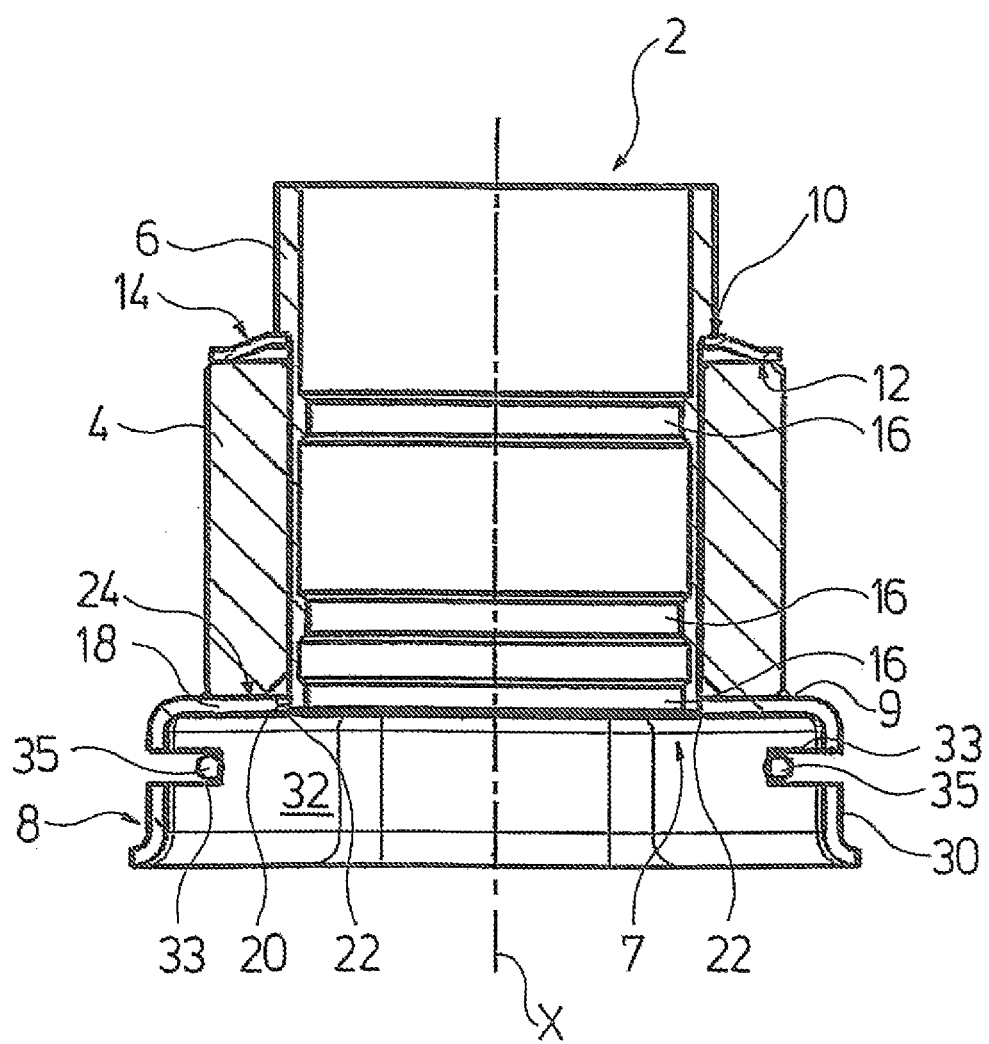

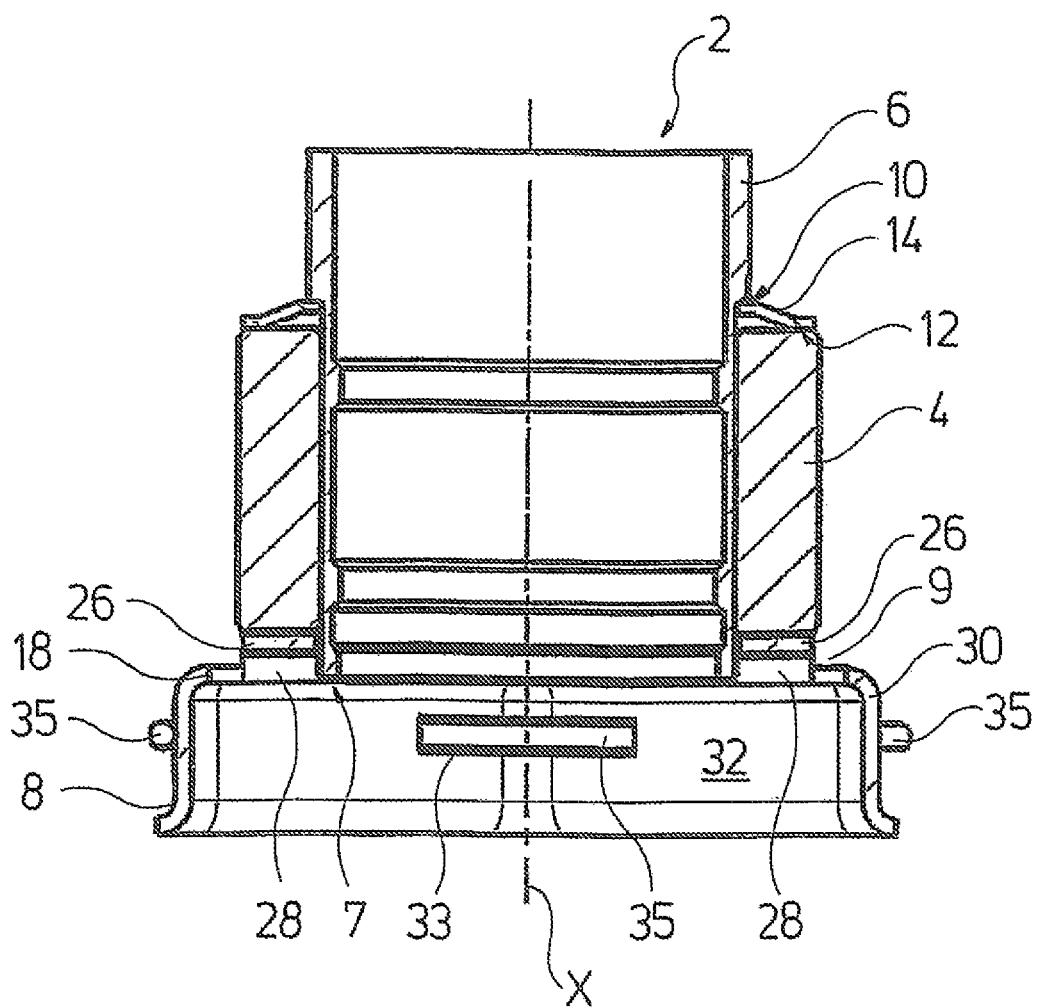

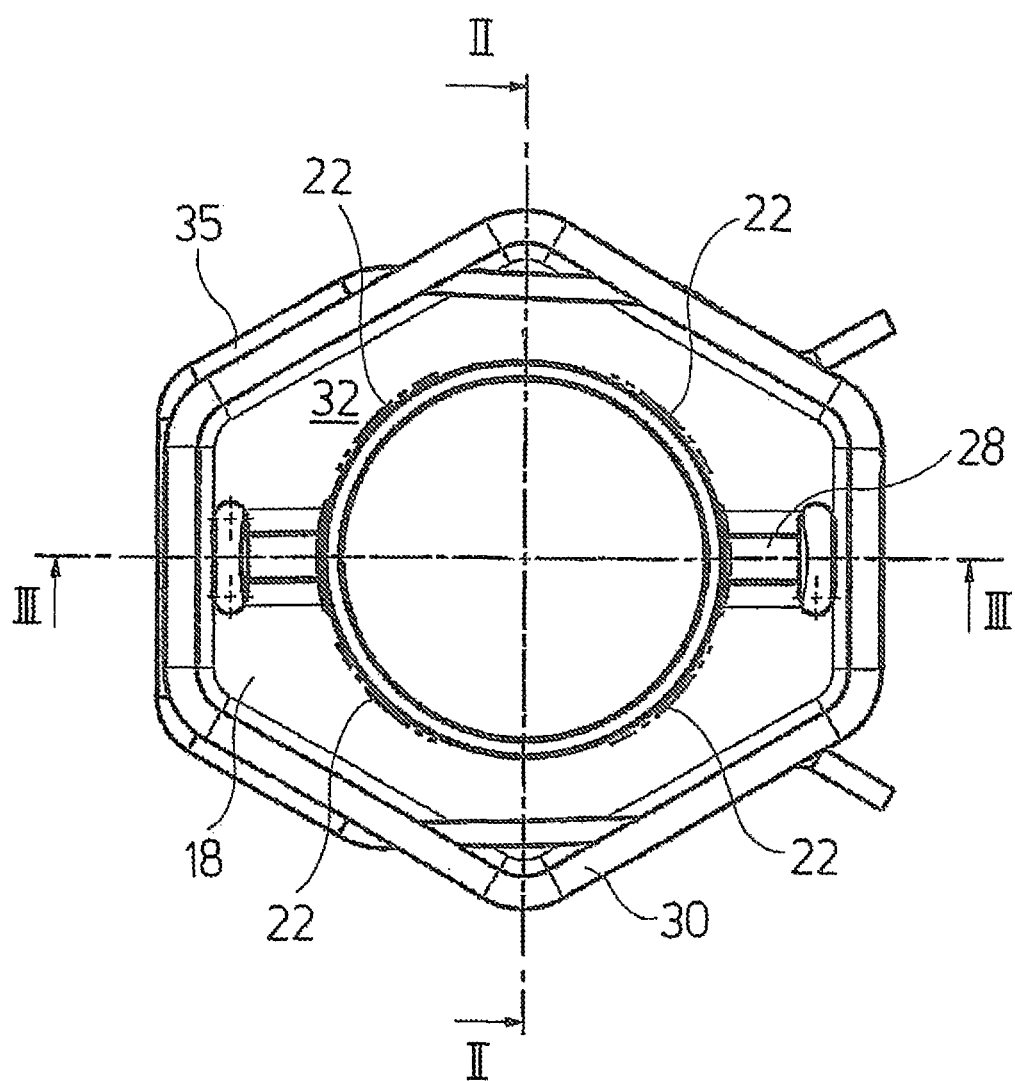

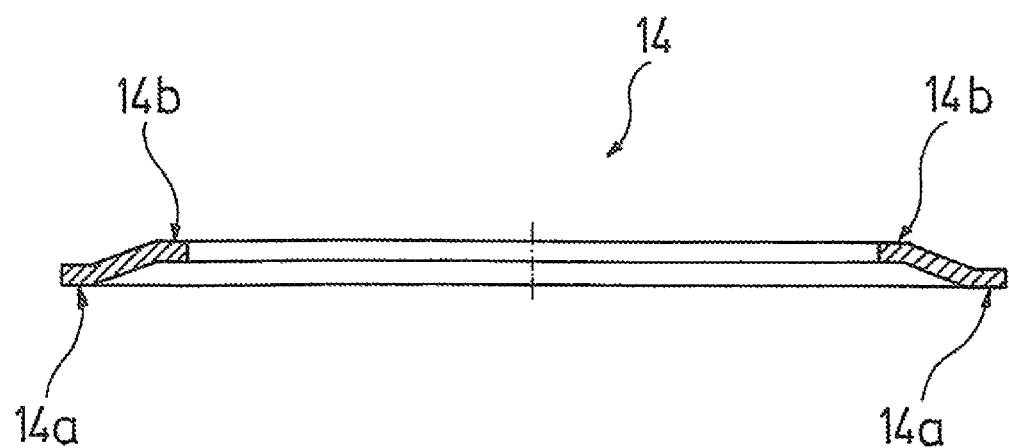
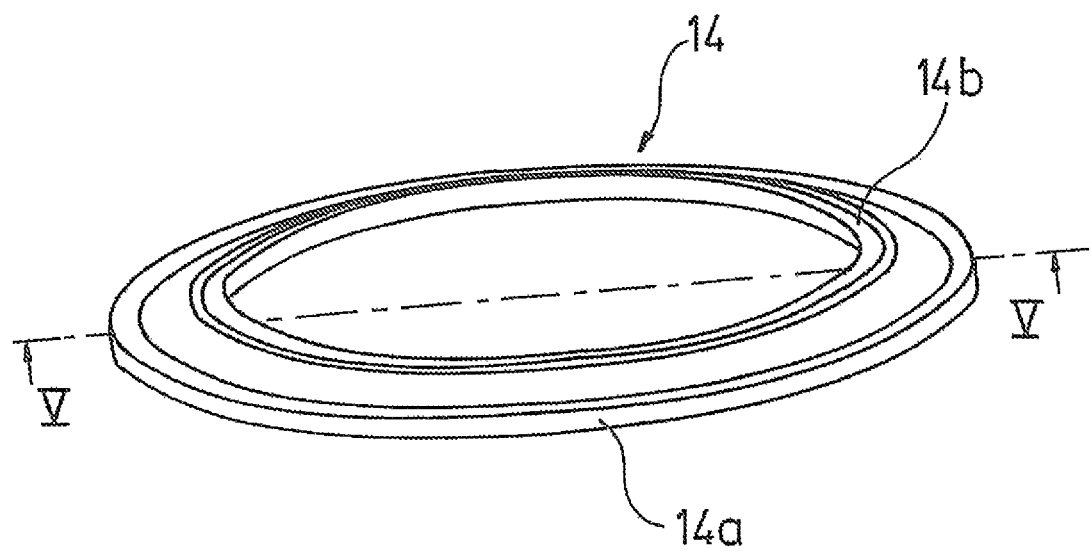

BEARING UNIT

BACKGROUND OF THE INVENTION

The invention relates to a bearing unit which is designed for attachment on a shaft of a pump assembly.

Bearing units are necessary in pump assemblies, in particular in multi-stage centrifugal pump assemblies, in order to mount the rotatable shaft in the radial direction, in particular also between the individual pump stages.

A bearing unit is known from German Utility Model DE 87 06 954 U. Here, a carrier bush is fixed on a shaft in a rotationally secured manner by way of driver pins. A bearing sleeve, which together with the carrier bush is fixed on the shaft in the axial direction via a screw, is arranged on the carrier bush by way of further driver pins. This arrangement, on the one hand, is not suitable to be attached on a continuous shaft, for example between individual pump stages. On the other hand, the arrangement of the driver or catch pins demands a very precise manufacture while maintaining the demanded tolerances, and leads to quite an elaborate assembly.

BRIEF SUMMARY OF THE INVENTION

Against this background, it is therefore the object of the invention, to provide an improved bearing unit for attachment on a shaft of a pump assembly and which is easier and less expensive to manufacture and to attach on a shaft.

According to the invention, this object is achieved by a preassembled bearing unit designed for attachment on a shaft of a pump assembly, the bearing unit having an inner sleeve for receiving the shaft and a bearing sleeve fixed on an outer periphery of the inner sleeve. At a first axial end the inner sleeve comprises a first contact shoulder as well as an engagement element, designed for positive, rotationally fixed engagement with the shaft or with a component connected to the shaft. At a second opposite axial end, the inner sleeve comprises a second contact shoulder which fixes the bearing sleeve in an axial direction X.

The object is also achieved by a method for manufacturing a preassembled bearing unit as described above, wherein a resilient element is attached on the inner sleeve against the second contact shoulder, the bearing sleeve is attached in a resting manner onto the inner sleeve against the resilient element, and the engagement element from the first axial end of the inner sleeve is tightened in the axial direction against the bearing sleeve and the second contact shoulder, and wherein the inner sleeve and the engagement element are welded to one another during the tightening.

The object is further achieved by a pump assembly having the features described above with a preassembled bearing unit and method of manufacturing the same. Advantageous designs are specified in the claims, the subsequent description and the drawings.

The bearing unit according to embodiments of the invention and which is designed for attachment on a rotatable shaft of a pump assembly comprises an inner sleeve for receiving the shaft, and a bearing sleeve which is fixed on the outer periphery of the inner sleeve. The bearing sleeve serves for coming into sliding contact with an outer stationary bearing ring, in a pump assembly, for radial mounting. For this, the bearing sleeve with its outer surface forming the bearing surface extends concentrically to the rotation axis. Preferably, the outer surface of the bearing sleeve has a circularly cylindrical outer contour. The inner sleeve serves as a carrier for the bearing sleeve and for the rotationally fixed fixation of the bearing sleeve on the shaft.

According to embodiments of the invention, the inner sleeve at a first axial end comprises a first contact (bearing contact) shoulder as well as an engagement element, which is designed for the positive-fit, rotationally fixed engagement with the shaft or with a component connected to the shaft. The inner sleeve at a second, opposite axial end comprises a second contact shoulder, which fixes the bearing sleeve in an axial direction. This means that the bearing sleeve with an axial end usefully bears on the first contact shoulder or is supported on the first contact shoulder, and with the opposite axial end is supported on the second contact shoulder, so that it is fixed in the axial direction between the contact shoulders.

The engagement element serves for fixing the inner sleeve with the bearing sleeve on the shaft in a rotationally fixed manner. The inner sleeve and/or the engagement element are thereby designed such that together with the bearing sleeve attached on the inner sleeve, they align themselves concentrically to the rotation axis of the shaft.

The engagement element as well as the first contact shoulder are arranged at a first axial end of the inner sleeve seen in the direction of the longitudinal axis. During the operation of the pump assembly, the inner sleeve and thus the bearing sleeve fixed on the inner sleeve at the outer periphery rotate with the shaft due to the positive-fit, rotationally fixed engagement of the engagement element with the shaft or with a component connected to the shaft. The bearing sleeve is fixed on the inner sleeve in a manner such that its longitudinal axis corresponds to the rotation axis of the shaft, upon attachment to a shaft.

The bearing sleeve is fastened on the inner sleeve such that, together with the engagement element, it forms a pre-manufactured bearing unit, which thus can be attached on the shaft in a simple manner with the assembly of a pump assembly.

The first and the second contact shoulders thereby permit a simple fixation of the bearing sleeve on the inner sleeve, specifically between the first contact shoulder at the first end of the inner sleeve and the second contact shoulder at the opposite second end of the inner sleeve.

Preferably, the first contact shoulder is formed by the engagement element. Thus, the bearing sleeve is fixed between the second contact shoulder and the engagement element. The first contact shoulder can be formed by an axial end of the engagement element, which preferably projects radially outward with respect to the inner sleeve.

Preferably, the preassembled bearing unit comprises at least one fixation element, preferably on the engagement element, and can axially fix the bearing unit on the shaft or on the component connected to the shaft. The fixation element thus serves for axially fixing the pre-manufactured bearing unit on the shaft. In this way, in particular, one can prevent the engagement element disengaging from the shaft or the component connected to the shaft, in the axial direction. Preferably, the fixation element is designed such that a releasable fixation of the engagement element is made possible, so that the bearing unit can be disassembled for maintenance or repair purposes, for example.

Particularly preferably, the at least one engagement element comprises a peripheral wall which comprises at least one slot, wherein the fixation element engages through the slot. The slot thereby extends advantageously transversely to the rotation axis of the shaft on the engagement element. The fixation element is thereby preferably designed such that it can engage with the slot as well as with the shaft or a component arranged on the shaft, with a positive fit. Thus, a groove or an undercut for example, with which the fixation element engages, can be provided on the shaft or on a component arranged on the shaft. With an axial movement of the engagement part with respect to the shaft or the component on the shaft, the fixation secured axially on the shaft comes into bearing contact with the wall of the slot on the engagement element. The axial movement can thus either be restricted or prevented. The slot moreover simplifies the assembly, since the fixation element can be simply inserted into the slot transversely to the rotation axis, in order to come into engagement with the shaft and/or a component connected to the shaft, for the axial securing. An elaborate screwing can be done away with in this manner.

In a preferred embodiment, the at least one fixation element is designed as a spring clip. The spring clip is designed from wire, for example, and has an elastic deformability. Thus, the spring clip can be deformed, in order to be brought into engagement with the engagement element and the shaft or a component connected to the shaft. By way of the elastic restoring forces, it is then held in the desired engagement with the components, for axial fixation. Thereby, the spring clip is preferably designed such that by way of elastic deformation, it is brought into engagement with the components to be fixed, such that it encompasses an undercut in its insertion direction, the undercut subsequently preventing the spring clip from inadvertently disengaging from the components again. For example, the spring clip can be pushed onto the shaft in the radial direction with respect to the rotation axis of the shaft, amid elastic widening and thereby, for example, be simultaneously inserted into the previously described slot, preferably into two diametrically opposite slots, on the engagement element. Subsequently, the spring clip after elastic recovery preferably engages around the opposite side of the shaft, so that it is also fixed in the radial direction.

The engagement element preferably has a peripheral wall which is not rotationally symmetrical and which is preferably designed in an angular manner at least at locations. The shaft or the component connected to the shaft, preferably in the region which engages with the engagement element, comprises a corresponding shape which is not rotationally symmetrical, so that a positive engagement between the non-rotationally-symmetrical peripheral wall and the shaft or a component connected to the shaft is rendered possible, and this permits a torque transmission from the shaft onto the engagement element. In particular, a partly angular, particularly preferably polygonal design of the peripheral wall can be provided, wherein the peripheral wall extends simultaneously preferably parallel to the rotation axis.

Thus, the peripheral wall on its inner periphery can be, for example, hexagonal in cross section. If the shaft or the component located on the shaft engages into the engagement element, then the inner periphery of the peripheral wall, which is designed hexagonally in at least one cross section, comes into bearing contact preferably with the outer wall of the shaft or of the component located on the shaft. The shaft or the component connected to the shaft preferably has a correspondingly hexagonal outer cross section, which permits it to positively engage with the hexagonal inner cross section of the engagement element, for torque transmission. If the inner peripheral wall of the engagement element extends parallel to the rotation axis, then the inner periphery thus has a hexagonal shape.

Alternatively, the engagement element can also have any other non-rotationally symmetrical design which comes into engagement in a rotationally fixed manner with a corresponding non-rotationally symmetrical design on the shaft or on a component fixed to the shaft. Thus, for example, radially inwardly directed projections can be provided on an inner peripheral wall of the engagement element, and these engage into corresponding recesses on the shaft or on a component connected to the shaft, with a positive fit.

Preferably, at least one ring is formed on the inner periphery of the inner sleeve and projects out of the inner periphery in a radial inwardly directed manner. The ring has an inner peripheral surface concentric to the bearing surface and preferably has an inner diameter which is adapted to the outer diameter of the shaft which is to extend through the inner sleeve. If the shaft engages through the inner sleeve, then the ring comes to bear on the outer surface of the shaft, peripherally of the rotation axis. The inner sleeve and thus the bearing unit are radially fixed and centered on the shaft by this at least one contact surface forming the inner periphery of the ring. Thus, free spaces result between the inner periphery of the inner sleeve which is not in bearing contact with the shaft, and the outer periphery of the shaft. These free spaces can be, for example, advantageous if during operation of the pump assembly, the shaft and the bearing unit become hot and different thermal expansions of the materials thereby occur. These free spaces can just as well simplify the assembly. The ring thus forms a centering surface which in the axial direction is designed in a short manner compared to the inner sleeve, by which the placing of the inner sleeve onto the shaft is simplified. Instead of a continuous ring as a centering surface, one can also provide several individual centering surfaces distributed over the periphery, on the inner periphery of the inner sleeve, and these come into bearing contact with the outer surfaces of the shaft in a centering manner.

Preferably, the bearing sleeve at a first axial end, which preferably faces the contact shoulder and the engagement element, comprises at least one catch which is engaged in a rotational fixed manner with at least one corresponding catch element formed on the engagement element, the first contact shoulder or the inner sleeve. The positive-fit engagement between the catch and the engagement element ensures that the bearing sleeve co-rotates together with the inner sleeve and thus with the shaft.

Particularly preferably, the at least one catch is designed as a recess or projection. The corresponding catch element is accordingly complementarily shaped. Particularly preferably, at least one recess, into which a projection on the inner sleeve, on the first contact shoulder or on the engagement element engages with a positive fit, is formed in the ceramic bearing sleeve. Particularly preferably, two catches are arranged on the bearing sleeve at diametrically opposite sides, and accordingly two diametrically oppositely arranged catch elements are arranged on the inner sleeve or on the engagement element.

The engagement element is preferably designed as a formed (reshaped) sheet-metal part. On account of forming the sheet metal, on the one hand, the engagement element can be given the necessary shape for the positive-fit engagement with the shaft or with a component connected to the shaft, and simultaneously a catch element or several catch elements can be shaped out in a simple manner, and these effect the positive-fit engagement with the bearing sleeve or its catch. Thus, the at least one catch element on the engagement element is preferably designed as an axially directed protuberance. The engagement element can be designed such that it extends radially beyond the outer periphery of the inner sleeve. Thus, an annular axial surface of the engagement element is created on the outer periphery of the inner sleeve, the surface preferably forming the first contact shoulder and on which preferably the catch element in the form of an axially directed protuberance is shaped out. Preferably, two such catch elements are formed on diametrically opposite sides. The catch or catches on the bearing sleeve are preferably designed as recesses or grooves on an axial face side of the bearing sleeve, into which recesses or grooves the axially directed catch elements engage. The design as a sheet metal shaped part has the advantage that the engagement contour for the positive-fit engagement with the shaft, and simultaneously the necessary catch elements for the positive-fit, rotationally fixed engagement with the bearing sleeve can be formed in a very inexpensive manner.

A spring is preferably arranged between the bearing sleeve and the second contact shoulder. It thus serves for the axial fixation of the bearing sleeve on the inner sleeve. Simultaneously, for example, the spring can yield in the axial direction due to its spring effect. On heating, stresses can occur due to the different thermal coefficients of expansion, since the bearing sleeve is preferably formed of a ceramic material and the inner sleeve is formed of a metallic material, in particular steel, and these stresses can thus be accommodated by the spring. Thus, in particular, the bearing sleeve is protected from excessive axial forces which could lead to damage to the bearing sleeve. Moreover, the shaft can also be protected. For example, steel elements (sleeve, engagement element) expand at high temperatures, e.g. above 240° C., in a manner such that the bearing sleeve expanding to a lesser extent could move relative to the shaft. Such a relative movement, with the wear that this entails, is prevented by the spring. Alternatively or additionally, a spring could also be arranged accordingly between the first contact shoulder and the bearing sleeve.

The spring can be designed as a spiral spring, for example. Particularly preferably, the spring is designed as a disk spring, wherein the disk spring preferably has an s-shaped or z-shaped cross section. In cross section, the disk spring thereby preferably at its axial ends comprises surfaces or limbs, which extend transversely to the rotation axis and which form axial contact surfaces. A section which is conical to the longitudinal axis, and which thus in cross section runs angled to the axial end surfaces, extends between these surfaces extending longitudinally or transversely to the rotation axis. This design prevents the spring being completely pressed flat. The disk spring with one axial end bears on the contact shoulder and with the opposite axial end on the axial face side of the bearing sleeve. Thereby, one of the axial ends of the disk spring forms the inner periphery and the other axial end forms the outer periphery. The inner periphery preferably bears on the contact shoulder.

Preferably, at least parts of the inner sleeve, of the engagement element, the first contact shoulder, the spring and/or at least one fixation element are manufactured of stainless steel, in particular of rust-free stainless steel. The use of rust-free stainless steel lends itself particularly with its application in a pump which delivers corrosive fluids, such as water, for example.

Moreover, the bearing sleeve is manufactured of ceramic, preferably of silicon carbide. Ceramic is a good bearing material which has a high wear resistance with a low friction. In particular, silicon carbide here has ideal characteristics. The bearing sleeve made of ceramic on its outer periphery thus forms a ceramic sliding surface which can come into sliding engagement with an oppositely lying, stationary bearing sleeve. The stationary bearing sleeve can likewise be formed from ceramic or be formed of another suitable material. Such a sliding bearing in a pump is preferably lubricated by the fluid to be delivered, for example water.

In a preferred embodiment, the inner sleeve is welded, preferably laser welded, to the engagement element and/or the first contact shoulder. In this manner, a fixed and permanent connection between the inner sleeve and the engagement element or the first contact shoulder is created. The inner sleeve is preferably manufactured as a turned part of metal, in particular steel and further preferably of stainless steel, whereas the engagement element, as specified above, is preferably manufactured as a formed part of sheet-metal, in particular rust-free stainless steel sheet metal. Both components can be permanently connected to one another in a simple manner by welding, despite the different manufacturing methods. The inner sleeve thereby engages preferably into the inner periphery of a circular recess or opening on an axial face side of the engagement element, which preferably forms the first contact shoulder, wherein an annular or partly annular welding seal is formed between the inner periphery of the opening and the outer periphery of the inner sleeve. The engagement element together with the first contact shoulder is preferably designed in a single piece manner, preferably in an essentially pot-like manner, and the opening, into which the inner sleeve engages, is arranged in the base of this pot-like shape. To the side which is away from the inner sleeve, the engagement element is preferably designed in an open manner, so that an at least partly annular welding seam can be formed from this side, between the inner periphery of the opening and the outer periphery of the inner sleeve adjacent to the axial face side of this sleeve. This permits a good accessibility for the incorporation of the welding seam. This is particularly the case since the inner sleeve is surrounded on the outer periphery by the bearing sleeve.

Particularly preferably, the inner sleeve is welded to the engagement element and/or the first contact shoulder along at least two sections, wherein a region between these sections has no welding. The welding seam between the inner sleeve and the engagement element or the first contact shoulder thus does not run in a continuous manner in the peripheral direction. To the contrary, the welding seam consists of at least two sections, wherein the two sections are not directly adjacent one another. Preferably, the engagement element or the first contact shoulder along the inner periphery of the opening, and the inner sleeve along its outer periphery are welded to one another over four sections in total, wherein each section extends peripherally over the inner sleeve by about 40°. Thus during the welding process, first along a first section, the inner sleeve is welded to the engagement element or the first contact shoulder. Subsequently, a second section is welded, wherein this second section lies diametrically opposite the first section with respect to the longitudinal axis of the inner sleeve. A further welding on a third section lying between the first and the second section follows. Finally, the inner sleeve is welded to the engagement element or to the first contact shoulder along the fourth section, wherein the fourth section lies directly opposite the third section with respect to the longitudinal axis of the inner sleeve. This welding in sections prevents a deformation of the inner sleeve, the first contact shoulder and/or the engagement element by a one-sided heating during the welding process. It is indeed due to the prevention of a deformation of the inner sleeve that a simple introduction of the shaft into the inner sleeve continues to be ensured.

The subject matter of the invention, apart from the previously described bearing unit, includes a method for manufacturing such a preassembled bearing unit. According to an embodiment of the invention, a resilient element or a spring is arranged on a second contact shoulder of an inner sleeve. Subsequently, a bearing sleeve is arranged on the inner sleeve or is pushed onto this, wherein a first axial end of the bearing sleeve rests on the resilient element. A first contact shoulder and an engagement element are tightened (braced) against the second axial end of the bearing sleeve which is opposite to the first axial end, in a manner such that the bearing sleeve is fixed in the axial direction between the first contact shoulder and the second contact shoulder. The inner sleeve is welded to the engagement element and/or to the first contact shoulder in this tightened position. The bearing sleeve is thus fixed in the axial direction between the contact shoulders. The resilient end is arranged between the second contact shoulder and the first axial end of the bearing sleeve. Thus, the thermal expansion in the axial direction can be accommodated by way of elastic deformation of the resilient element. At the inner periphery, the bearing sleeve bears on the outer periphery of the inner sleeve. The bearing unit, due to the welding of the inner sleeve to the engagement element, forms a non-releasable, preassembled subassembly which can be simply arranged on a shaft of a pump assembly.

In a preferred embodiment, the spring described above as a resilient element is thus first pushed onto the inner sleeve from an axial end, and the bearing sleeve is subsequently pushed on, so that the bearing sleeve with the intermediately lying spring comes to bear on the second contact shoulder of the inner sleeve. Subsequently, the engagement element, on which preferably the first contact shoulder is formed as one piece is stuck onto the inner sleeve and is welded to this at the axial end in the described manner. The bearing sleeve is then permanently fixed between the engagement element and the contact shoulder in this manner. The bearing sleeve thereby preferably bears on an annular axial surface of the engagement element which projects radially beyond the outer periphery of the inner sleeve. After the welding, the bearing sleeve is non-releasably fixed on the inner sleeve, so that a preassembled bearing unit which is easy to handle is created. The complete manufacture is simple, since one can make do without screw connections and the application of loose components, such as catch (driver) pins. In contrast, the complete bearing unit is preferably formed from only four components, specifically the inner sleeve, the bearing sleeve, the engagement element, and the spring. The preceding description of the bearing unit is referred to with regard to further details of the method.

The subject matter of the invention, apart from the previously described bearing unit and the method for manufacturing a preassembled bearing unit, is a pump assembly with such a bearing unit for mounting the shaft. With regard to the pump assembly, it is the case of a centrifugal pump assembly with an impeller which is rotationally driven by a drive motor via a shaft. The previously described bearing unit serves for the radial mounting of the shaft. In particular, the pump assembly can be designed as a multi-stage centrifugal pump. Then, optionally, one can provide several of the previously described bearing units for the radial mounting of the shaft. In the pump assembly, the shaft preferably comprises engagement sections which correspond to the engagement element and which can engage with the engagement element with a positive fit and in a rotationally fixed manner. Particularly preferably, the engagement sections are designed as separate components in the form of coupling elements which are connected to the shaft. The coupling elements can preferably be parts of the impellers or, however, can be fastened on the impellers or carriers for the impellers. The coupling elements are preferably fixed on the shaft with a non-positive fit. Preferably, they are fixed together with the impellers on the shaft with a non-positive fit. This can be effected via a cone connection, for example.

Particularly preferably, the coupling element can be designed as a union nut which on its outer periphery has a contour, in particular a hexagonal cross section or indentations, which are designed in a manner corresponding to the inner contour of the engagement element, in order to engage with this with a positive fit. The union nut is preferably screwed onto a cylindrical sleeve of an impeller carrier and presses a conical clamping sleeve arranged in the inside of the inner sleeve of the impeller carrier, into the inner sleeve of the impeller carrier in the axial direction, so that the clamping sleeve is pressed onto the outer periphery of a shaft extending through the impeller carrier and the union nut. Thus, a positive-fit connection of the impeller or of the impeller carrier for torque transmission on the shaft is realized. Simultaneously, the part which serves for the fixation of the impeller, specifically the union nut, serves as a coupling element or engagement element for the positive-fit engagement into the engagement element of the bearing carrier, so that the bearing carrier is fixed on the shaft in a rotationally fixed manner. The bearing carrier as described above is centered on the shaft in the radial direction, preferably by the inner contour of the inner sleeve of the bearing unit. The shaft preferably has a circularly cylindrical shape with a smooth outer contour.

With regard to the pump assembly it is the case of a multistage centrifugal pump assembly, where a bearing unit is arranged preferably on each pump stage in the described manner.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is a longitudinal section of the bearing unit according to FIG. 1, along the line II-II in FIG. 4a;

FIG. 3 is a longitudinal section of the bearing unit according to FIGS. 1 and 2, in a plane rotated by 90°, along the line in FIG. 4a;

FIG. 4a is a plan view of the first axial end of the bearing unit according to FIGS. 1 to 3;

FIG. 5a is a perspective entire view of an embodiment of a spring of the bearing unit according to the invention;

FIG. 5b is a sectioned view of the spring along line V-V in FIG. 5a;

DETAILED DESCRIPTION OF THE INVENTION

Figure 1:
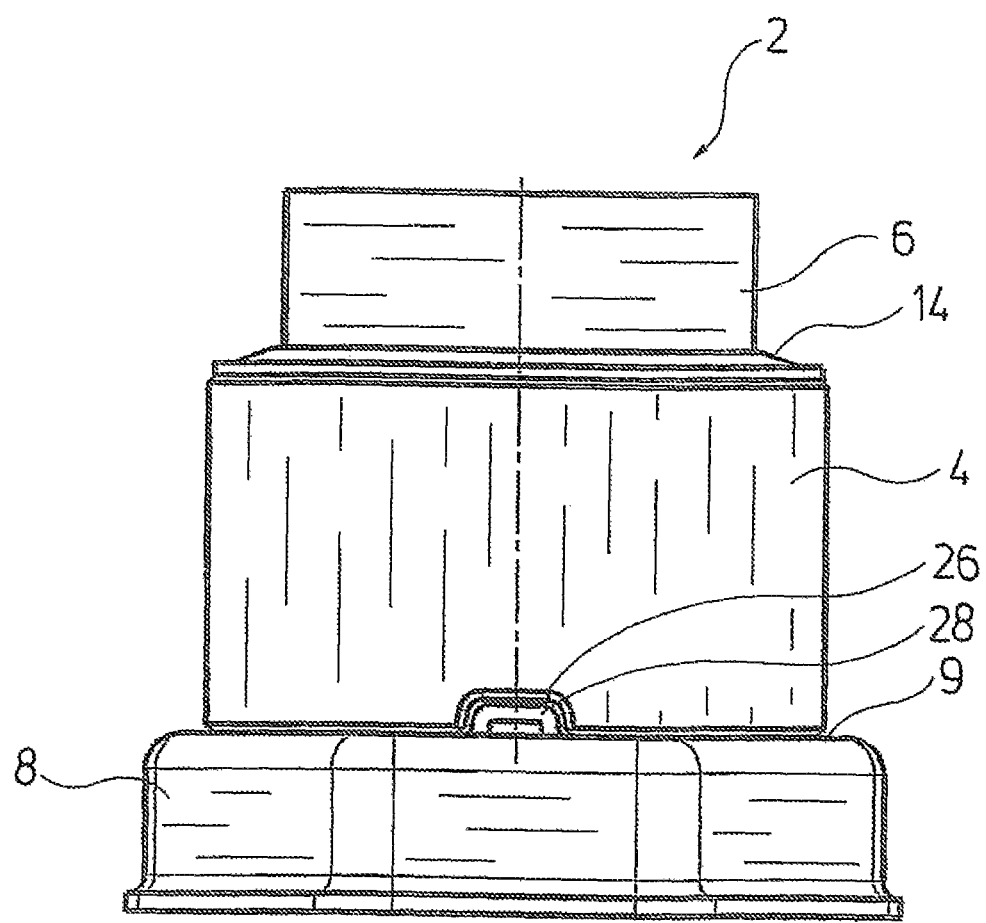
FIG. 1 is a lateral elevation view of a bearing unit according to an embodiment of the invention.

The bearing unit 2 shown in FIG. 1 serves for the radial mounting of a shaft of a pump assembly, in particular of a multistage pump assembly. Such a bearing unit 2, as is later described by way of FIG. 6, can be provided in each pump stage. The bearing unit 2 according to embodiments of the invention is pushed onto the shaft and is centered on the shaft and is fixed with a positive fit for torque transmission. The bearing unit 2 is composed of only four components. An essential element is a bearing sleeve 4 made of a ceramic material, which has an annular shape with a circularly cylindrical outer peripheral surface which forms the radial bearing surface. The bearing sleeve 4, as is the case with the complete bearing unit 2, extends concentrically to the longitudinal axis X, which corresponds to the rotation axis of the shaft of the pump assembly. The bearing sleeve 4 is applied onto an inner sleeve 6 made of metal, in particular of stainless steel. At its first axial end 7, the inner sleeve 6 is connected to an engagement element 8, which serves for coupling to the shaft for torque transmission. The engagement element 8 comprises an axial surface forming the first contact shoulder 9. The bearing sleeve 4 is fixed on the outer periphery of the inner sleeve 6 in the axial direction, between the axial surface of the engagement element 8 and a second contact shoulder 10 spaced from the first axial end 7. An annular spring 14 is arranged between the contact shoulder 10 and the axial end 12 of the bearing sleeve 4.

The spring 14 is designed as a disk spring. It has a z-shaped cross section which comprises limbs which extend radially outwardly as well as inwardly, transversely to the longitudinal axis, and which form two opposite axial contact surfaces 14a and 14b (see FIGS. 5a and 5b), wherein the contact surface 14a is adjacent the outer periphery and the contact surface 14b is adjacent the inner periphery. In cross section, a section running in an angled manner extends between the two limbs. This section between the two contact surfaces forms an intermediate piece of the disk spring which runs conically with respect to the longitudinal axis.

The spring 14 with its inner peripheral contact surface 14b comes to bear on the contact shoulder 10 and with its axial opposite outer peripheral contact surface 14a bears on the axial end 12 of the bearing sleeve 4. The inner sleeve 6 is preferably designed as a turned part and at its outer periphery has a stepped, circularly cylindrical contour. The annular second contact shoulder 10 which faces the first axial end 7 is created due to the stepped design. The contact shoulder 10 is thus a radially outwardly projecting step on the outer periphery of the inner sleeve 6. The inner sleeve 6 between the second contact shoulder 10 and the first axial end 7 forms a circularly cylindrical contact surface, on which the bearing sleeve 4 bears with its inner periphery.

Three radially inwardly projecting rings 16 (see FIG. 2), whose annular inner diameters are concentric to the longitudinal axis X and to the outer periphery surface of the bearing sleeve 4, are formed out on the inner periphery of the inner sleeve 6. The inner diameters of the annular projections or rings thereby correspond to the outer diameter of a shaft to be accommodated, so that the inner sleeve 6 and thus the entire bearing unit 2 can be centered on the shaft via the rings 16. The inner sleeve 6 can be pushed onto the shaft in a simple manner, due to the fact that the inner sleeve 6 only comes to bear with the rings 16 on the outer periphery of the shaft, since the danger of a jamming and friction is minimized.

The engagement element 8 is designed as a formed part of sheet metal and has an essentially pot-like shape with an axial surface or a base 18 which faces the inner sleeve 6. The engagement element 8 is applied with the base 18 onto the first axial end 7 of the inner sleeve 6. For this, the base 18 has a circular opening 20 which is concentric to the longitudinal axis X and which has an inner diameter which corresponds to the outer diameter of the inner sleeve 6 at its first axial end 7. Thus, the inner sleeve 6 with its first axial end 7 engages into the opening 20 in a manner such that its axial end 7 terminates with the inner side of the base 18 in a flush manner. A welding seam 22 firmly welding the inner sleeve 6 and engagement element 8 to one another is incorporated between the inner periphery of the opening 20 and the outer periphery of the inner sleeve 6. The welding seam 22 thereby consists of four individual sections, wherein each section peripherally along the outer surface of the inner sleeve 6 describes an arc of about 40°, and in each case two sections of the welding seam 22 are arranged lying diametrically opposite one another with respect to the longitudinal axis X of the inner sleeve 6, along the outer periphery of the inner sleeve 6. In each case, a region between the inner periphery of the opening and the outer periphery of the inner sleeve 6, and in which no welding seam 22 is incorporated, is located between two adjacent sections of the welding seam 22. The engagement element 8 is likewise designed preferably of rust-free stainless steel.

The base 18 thus departing from the opening 20 projects radially outwardly beyond the outer periphery of the inner sleeve 6 and thus forms a first contact shoulder 9, on which the bearing sleeve 4 comes to bear with its second axial end 24. Thereby, the spring 14 presses the bearing sleeve 4 against the base 18, so that the axial end 24 of the bearing sleeve 4 is held in bearing contact with the base 18. The bearing sleeve 4 is thereby fixed in the axial direction between the second contact shoulder 10 and the base 18 of the engagement element 8 which forms the first contact shoulder 9. The arrangement of the spring 14 thereby has the advantage that length changes, due to different coefficients of thermal expansion of the ceramic material of the bearing sleeve 4 and of the metal of the inner sleeve 6, can be compensated, so that the bearing sleeve 4 is kept free from excessive compressive loads in the axial direction X.

The bearing sleeve 4 at two sides which are diametrically opposite on its second axial end 24 comprises two axially aligned recesses 26 (see FIG. 3), which form catches for the torque transmission, in order to be able to create a rotationally fixed connection between the engagement element 8 and the bearing sleeve 4. Axially directed protuberances 28 on the base 18 or the first contact shoulder 9 of the engagement element 8 engage into the recesses 26. The protuberances 28 can be shaped by way of forming (reshaping) the base 18 of the engagement element 8. The protuberances 28 thus form catch elements which, with the recesses 26 in the bearing sleeve 4, ensure a rotationally fixed connection between the bearing sleeve 4 and the engagement element 8.

Figure 4B:
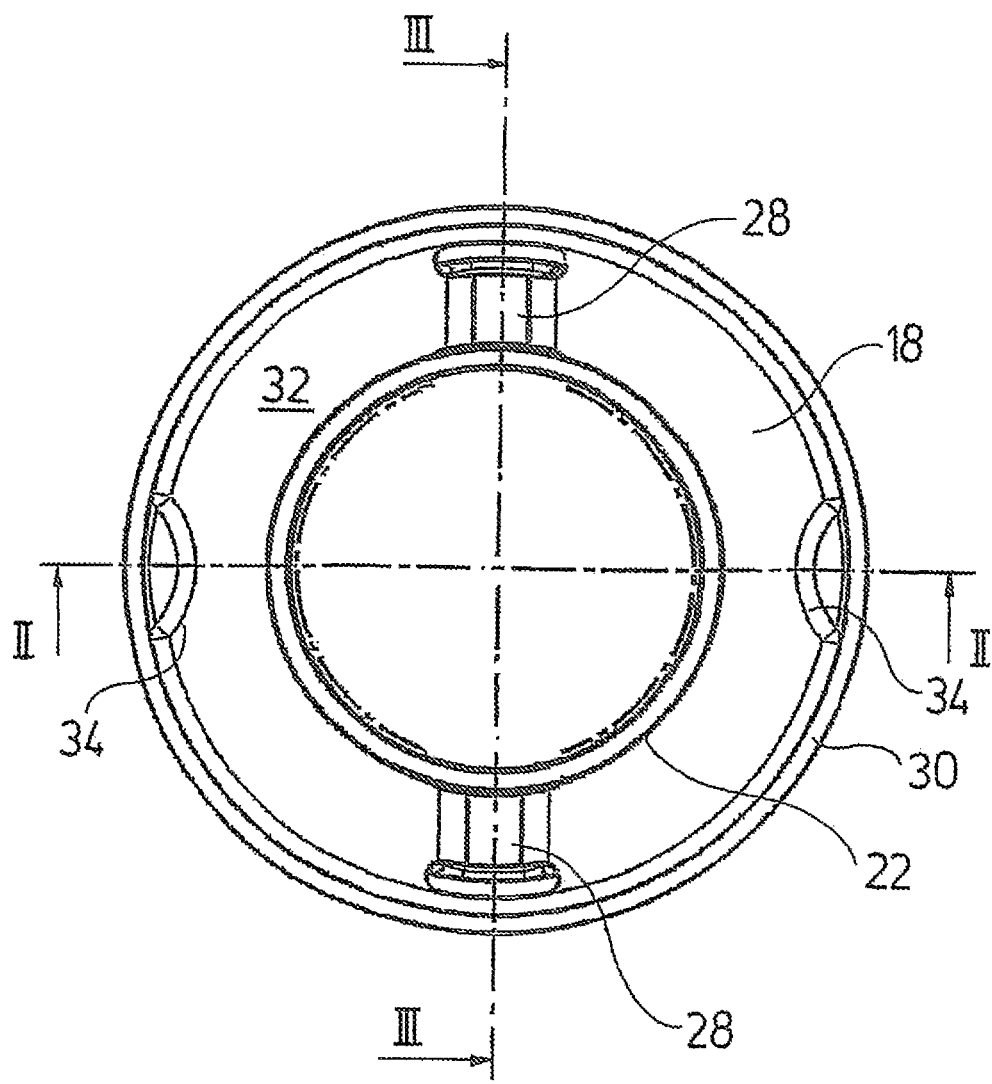
FIG. 4b a plan view of the first axial end of the bearing unit according to an alternative embodiment of the invention.

The engagement element 8 here comprises a hexagonal wall 30 which, departing from the base 18, extends in the axial direction X away from the inner sleeve 6 (FIG. 4a). The inner periphery of the wall 30 is thus not rotationally symmetrical. The inner diameter of the wall 30 is larger than that of the inner sleeve 6. The wall 30 encloses a receiver space 32 which is open to its end which faces away from the base 18. The receiver space 32 is provided for receiving an engagement section of a coupling element 42 (see FIG. 6) which is fixed on the shaft. In order to permit a torque transmission from such a coupling element 42 onto the engagement element 8, the wall 30 in this embodiment example comprises slots 33 which run parallel to one another and which extend tangentially to the longitudinal axis X, on two diametrically opposed sides. In an alternative or supplementary embodiment, the wall 30, instead of the hexagonal shape can comprise radially inwardly directed indentations (FIG. 4b) on the two diametrically opposed sides. The two indentations 34 are arranged offset by 90° to the protuberances 28 in the engagement element 8. The engagement element 8 with this embodiment can comprise an annular wall 30. The inner periphery of the wall 30 is designed in a non-rotationally symmetrical manner due to the two indentations 34 in the annular wall 30.

A fixation element is designed as a spring clip 35, for example manufactured of wire, and is elastically deformable. The slots 33 of the engagement element 8 are designed in a manner such that the slots 33 can receive the spring clip 35 with its wire diameter. In the assembled condition of the spring clip 35 on the engagement element 8, the spring clip 35 engages through both slots 33, so that the spring clip 35 extends in the slots 33 in a chord-like manner to the annular wall 30. Moreover, the spring clip 35 in the assembled condition bears almost completely on the outer side of the wall 30 of the engagement element 8. Hereby, the two end-pieces of the spring clip 35 form exceptions. These are bent radially outwardly, so that during the assembly or the disassembly of the spring clip 35 onto and from the engagement element 8, a simple gripping of the spring clip 35 via its end pieces is rendered possible. The spring clip 35 is thus slightly elastically widened due to the action on the end pieces of the spring clip 35. This permits a simple attachment or removal of the spring clip 35 onto and from the engagement element 8.

The embodiment of the engagement element 8 with slots 33 and with the spring clip 35 (FIG. 4a) is envisaged as an axial fixation preferably with pump assemblies with only one pump stage. It is indeed with a small number of pump stages that this fixation element can permit an axial fixation of the bearing unit 2 on the shaft by way of a simple assembly.

Instead of designing the receiver space 32 in the inside of the wall 30 circularly in cross section with the indentations, the wall 30 could also have other shapes of the inner contour of the wall 30 and of the outer contour of the union nut 42, the shapes being suitable for torque transmission.

The bearing unit 2 described previously by way of FIG. 1 to FIG. 4b thus forms a pre-manufactured construction unit or subassembly. For its assembly, first the spring 14 and then the bearing sleeve 4 are pushed onto the inner sleeve 6. Subsequently, the engagement element 8 is placed onto the inner sleeve 6, and the welding seam 22 incorporated, so that the bearing unit 2 is assembled in a fixed and non-releasable manner. The thus preassembled bearing unit 2 is then applied in a pump assembly as is explained by way of FIGS. 6 and 7.

Figure 6:
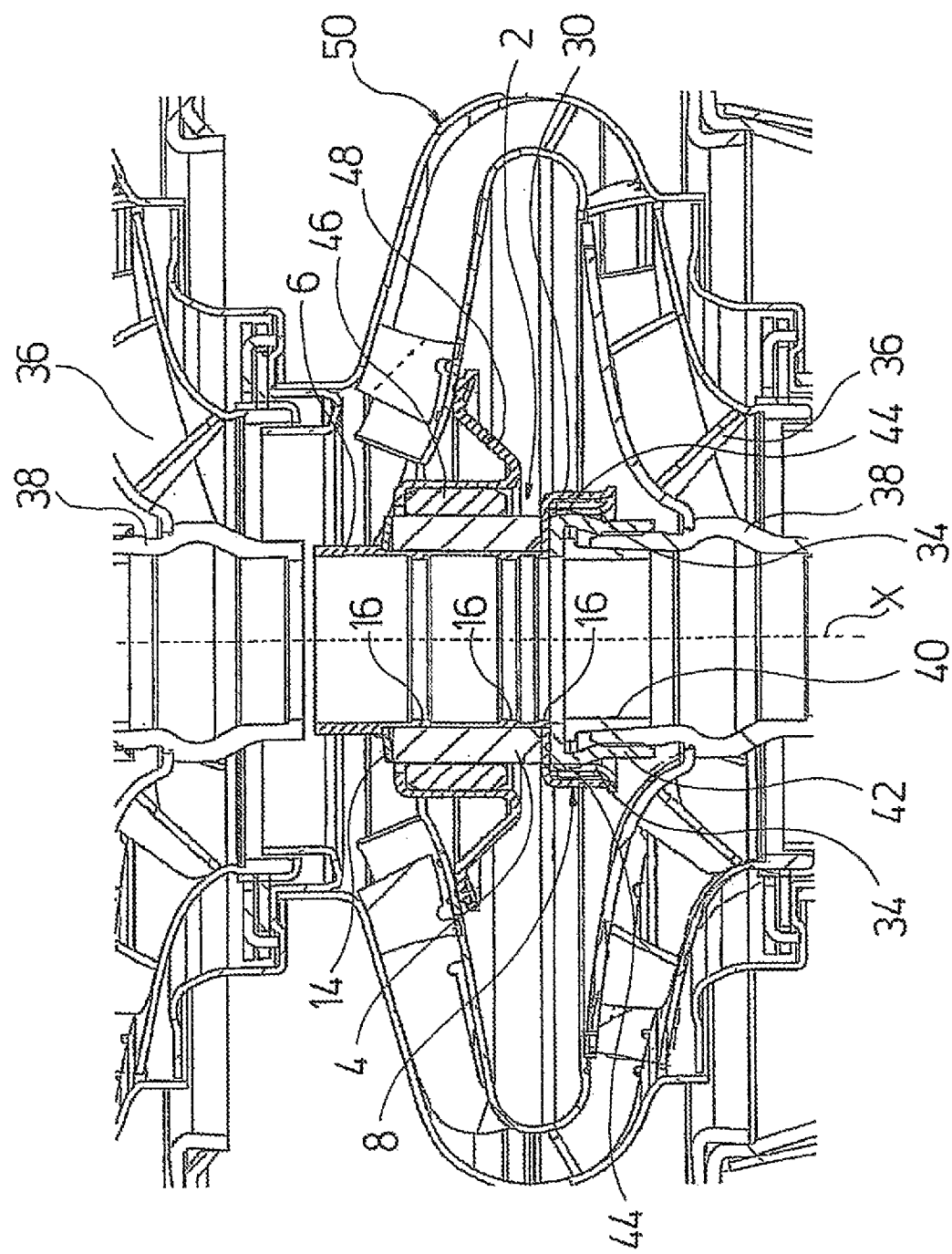
FIG. 6 is a sectioned view of a pump stage of a multi-stage centrifugal pump assembly having the bearing unit according to FIG. 4b.

In FIG. 6, the shaft which extends along the rotation or longitudinal axis X is not shown. An impeller 36 comprises a central hub or an impeller carrier 38, through which the shaft extends along the longitudinal axis X and with which the impeller 36 is fixed on the shaft in a rotationally fixed manner. For this, a conical clamping sleeve 40, which is fixed by a union nut 42 on the impeller carrier 38, engages into the impeller carrier 38 from an axial end. The union nut 42 comprises an inner thread which is engaged with an outer thread on the axial end of the impeller carrier 38. The impeller carrier 38 is likewise designed in a conical manner at the inner periphery. By screwing on the union nut 42, the clamping sleeve 40 is pushed axially into the inside of the impeller carrier 38. Thereby, the clamping sleeve 40 is pressed onto the outer periphery of the shaft by the conical surfaces, and thus the impeller carrier 38 with the impeller 36 is fixed on the shaft with a non-positive fit.

The union nut 42 serves simultaneously as a coupling element for engagement into the receiver space 32 of the engagement element 8 of the bearing unit 2. The bearing unit 2 is likewise pushed onto the shaft, so that the shaft extends through the inside of the inner sleeve 6 and comes to bear on the inner periphery of the rings 16, whereby the bearing unit 2 is centered on the shaft. The union nut 42 in this embodiment example on its outer periphery comprises two radially outwardly directed recesses 44, into which the indentations 34 on the inner periphery of the wall 30 of the engagement element 8 engage. Thus, a positive-fit rotationally fixed coupling is achieved between the union nut 42 and the engagement element 8. The recesses 44 thereby form engagement sections, which engage with the engagement element 8 with a positive fit. The bearing unit 2 is coupled to the shaft in a rotationally fixed manner in this way.

In an alternative or supplementary embodiment, the union nut 42 can comprise two grooves which are parallel to one another, run perpendicularly to the longitudinal axis X, and in the assembled condition of the engagement element 8 on the union nut 42 are flush or aligned with the slots 33 of the engagement element 8, for axial fixation of the bearing element 2 on the shaft. The engagement element 8 and the union nut 42 thereby have a hexagonal wall, wherein the inner periphery of the wall 30 of the engagement element 8 and the outer periphery of the union nut 42 are designed in a manner such that the union nut 42 is seated in the engagement element 8 with a positive fit in the assembled condition. The engagement element 8 and the union nut 42 are thus connected to one another with a positive fit in the axial direction via a spring clip 35, which engages into the slots 33 of the engagement element 8 as well as into the grooves of the union nut 42.

The bearing sleeve 4 with its outer peripheral surface, which forms the bearing surface, slides on the inner periphery of a stationary, outer bearing ring 46, which is likewise manufactured of ceramic and via a carrier 48 is fixed on the guide vane 50 arranged between two pump stages. In this manner, with a multistage pump assembly, the further pump stages can also be designed such that the shaft is mounted in the radial direction via a bearing unit 2, in each pump stage.

Figure 7:
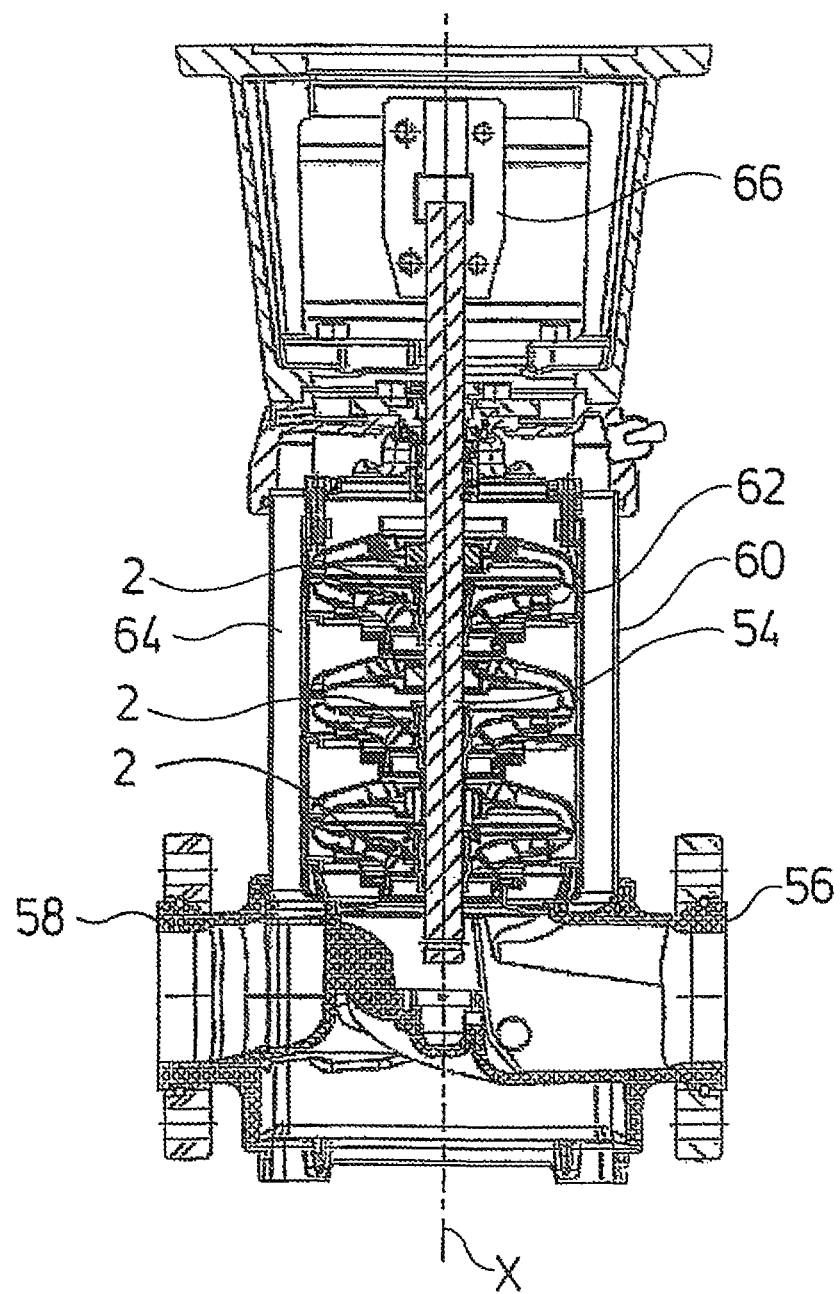
FIG. 7 is a sectioned view of a multi-stage pump assembly having several pump stages according to FIG. 6.

The centrifugal pump assembly 52 in FIG. 7 comprises several pump stages with impellers 36 as previously described, wherein the pump stages are arranged along a common shaft 54. This embodiment example shows three pump stages. However, in the context of the invention, another number of pump stages can also be arranged on the pump assembly 52. The shaft 54 is aligned along the longitudinal axis X of the pump assembly 52. The embodiment example is designed as an inline pump. Thus, a suction connection 56 as well as a pressure connection 58 are arranged in a first housing part, which is arranged axially on the lower end of the pump assembly 52. The mounting of the impeller 36 as an individual pump stage on the shaft 54 is thereby effected in each case via a bearing unit 2 and a union nut 42, as described beforehand by way of FIG. 6. On the outer periphery, the several pump stages are surrounded by an outer wall 60 and an inner wall 62. A channel 64 is formed between the outer wall 60 and the inner wall 62. The channel 64 leads the medium delivered by the pump stages to the pressure connection 58. In this embodiment example, a second housing part is arranged on the axial upper end of the pump assembly 52. A coupling 66 for connection to a motor, and which receives the axial upper end of the shaft 54 and sets the shaft into rotation, is arranged on this second housing part. The rotation is transmitted via the union nuts 42 (see FIG. 6) onto the bearing units 2 and thus onto the impellers 36 of the pump stages.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A preassembled bearing unit attachable on a shaft of a pump assembly, comprising:
    an inner sleeve which receives the shaft;
    a bearing sleeve fixedly attached on a radially outwardly facing periphery of the inner sleeve;
    a first contact shoulder formed at a first axial end of the inner sleeve;
    a second contact shoulder formed at a second axial end of the inner sleeve opposite the first axial end, the second contact shoulder fixing the bearing sleeve in an axial direction (X); and
    an engagement element for coupling the bearing unit to the shaft for torque transmission, the engagement element being connected to the first axial end of the inner sleeve and having an essentially pot-like shape with an axial surface or a base which faces the inner sleeve and which forms the first contact shoulder,
    wherein the bearing sleeve is supported with an axial end on the first contact shoulder and with an opposite axial end on the second contact shoulder, so that the bearing sleeve is fixed in the axial direction between the first contact shoulder and the second contact shoulder,
    wherein the bearing unit comprises at least one fastener on the engagement element for axially fixing the bearing unit on the shaft or on a coupling element connected to the shaft, and
    wherein the engagement element comprises a peripheral wall having at least one slot, and wherein the at least one fastener engages through the at least one slot.

2. The preassembled bearing unit according to claim 1, wherein the engagement element comprises a non-rotationally symmetrical peripheral wall at least in locations in an angled manner.

3. The preassembled bearing unit according to claim 2, wherein the peripheral wall at its inner periphery is hexagonal in cross section.

4. The preassembled bearing unit according to claim 1, wherein at least one ring is formed on an inner periphery of the inner sleeve and projects radially inwardly from the inner periphery.

5. The preassembled bearing unit according to claim 1, wherein the bearing sleeve comprises at least one catch arranged at a first axial end facing the first contact shoulder and the engagement element, wherein the at least one catch is engaged in a rotationally fixed manner with at least one corresponding catch element formed on the engagement element, the first contact shoulder or the inner sleeve.

6. The preassembled bearing unit according to claim 5, wherein the at least one catch comprises a recess or projection.

7. The preassembled bearing unit according to claim 1, further comprising a spring arranged between the bearing sleeve and the second contact shoulder of the inner sleeve.

8. The preassembled bearing unit according to claim 7, wherein the spring is a disk spring having an s-shaped cross section.

9. The preassembled bearing unit according to claim 7, wherein the inner sleeve, the spring, the engagement element, the first contact shoulder, a fastener, or a combination thereof is manufactured of stainless steel.

10. The preassembled bearing unit according to claim 1, wherein the bearing sleeve is manufactured of ceramic.

11. The preassembled bearing unit according to claim 10, wherein the bearing sleeve is manufactured of silicon carbide.

12. The preassembled bearing unit according to claim 1, wherein the inner sleeve is welded to the engagement element, the first contact shoulder, or a combination thereof.

13. The preassembled bearing unit according to claim 12, wherein the inner sleeve, when welded to the engagement element, is welded to the engagement element at at least two sections, and wherein a region between the at least two welded sections has no welding.

14. A method for manufacturing a preassembled bearing unit according to claim 1, comprising:
    attaching a resilient element on the inner sleeve against the second contact shoulder;
    attaching the bearing sleeve in a resting manner onto the inner sleeve against the resilient element; and
    tightening the engagement element from the first axial end of the inner sleeve in the axial direction against the bearing sleeve and the second contact shoulder,
    wherein the inner sleeve and the engagement element are welded to one another during the tightening.

15. A pump assembly comprising a multistage centrifugal pump having a preassembled bearing unit according to claim 1.

* * * * *